United States Patent
Edelman et al.

(10) Patent No.: US 8,301,796 B2
(45) Date of Patent: Oct. 30, 2012

(54) REAL-TIME PRIORITY-BASED MEDIA COMMUNICATION

(75) Inventors: Bradley A. Edelman, San Francisco, CA (US); Jonathan Gay, Mill Valley, CA (US); Slavik Lozben, San Francisco, CA (US); Pritham Shetty, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/250,199

(22) Filed: Sep. 30, 2011

(65) Prior Publication Data
US 2012/0023255 A1    Jan. 26, 2012

Related U.S. Application Data

(63) Continuation of application No. 12/554,775, filed on Sep. 4, 2009, now Pat. No. 8,065,426, which is a continuation of application No. 11/841,517, filed on Aug. 20, 2007, now Pat. No. 7,587,509, which is a continuation of application No. 10/366,646, filed on Feb. 13, 2003, now Pat. No. 7,272,658.

(51) Int. Cl.
*G06F 15/16* (2006.01)

(52) U.S. Cl. .................. 709/231; 709/219

(58) Field of Classification Search ............ None
See application file for complete search history.

(56) References Cited

U.S. PATENT DOCUMENTS

| 5,541,852 A | 7/1996 | Eyuboglu et al. |
| 5,574,934 A | 11/1996 | Mirashrafi et al. |
| 5,602,831 A | 2/1997 | Gaskill |
| 5,661,665 A | 8/1997 | Glass et al. |

(Continued)

FOREIGN PATENT DOCUMENTS

WO    WO 96/31020    10/1996

OTHER PUBLICATIONS

Advantages of On2 VP6 Technology. On2 Technologies white paper. Oct. 20, 2006.

(Continued)

*Primary Examiner* — Peling Shaw
(74) *Attorney, Agent, or Firm* — Fish & Richardson P.C.

(57) ABSTRACT

Representative embodiments are disclosed of a real-time priority-based communication system and method for communicating media streams made up of multiple media message sub-streams, the communication system comprising a chunk configurator for dividing media message sub-streams into chunks, a state machine configured to translate between information regarding the media message sub-streams and the chunks and state associations to the information, the state associations written into a header for each of the chunks, a queue for holding the chunks waiting to be transmitted, and a processor for executing a scheduling algorithm, wherein the scheduling algorithm determines ones of the chunks in the queue to transmit next.

24 Claims, 7 Drawing Sheets

U.S. PATENT DOCUMENTS

| | | | |
|---|---|---|---|
| 5,664,116 | A | 9/1997 | Gaytan et al. |
| 5,751,968 | A | 5/1998 | Cohen et al. |
| 5,768,527 | A | 6/1998 | Zhu et al. |
| 5,805,804 | A | 9/1998 | Laursen et al. |
| 5,841,432 | A | 11/1998 | Carmel et al. |
| 5,892,915 | A | 4/1999 | Duso et al. |
| 5,928,330 | A | 7/1999 | Goetz et al. |
| 5,969,763 | A | 10/1999 | Sakamoto |
| 6,032,197 | A | 2/2000 | Birdwell et al. |
| 6,037,983 | A | 3/2000 | Au et al. |
| 6,044,205 | A | 3/2000 | Reed et al. |
| 6,057,832 | A | 5/2000 | Lev et al. |
| 6,064,379 | A | 5/2000 | DeMoney |
| 6,067,303 | A | 5/2000 | Aaker et al. |
| 6,085,252 | A | 7/2000 | Zhu et al. |
| 6,112,024 | A | 8/2000 | Almond et al. |
| 6,148,334 | A | 11/2000 | Imai et al. |
| 6,163,796 | A | 12/2000 | Yokomizo |
| 6,216,157 | B1 | 4/2001 | Vishwanath et al. |
| 6,269,394 | B1 | 7/2001 | Kenner et al. |
| 6,275,536 | B1 | 8/2001 | Chen et al. |
| 6,317,416 | B1 | 11/2001 | Giroux et al. |
| 6,329,986 | B1 | 12/2001 | Cheng |
| 6,389,473 | B1 | 5/2002 | Carmel et al. |
| 6,397,230 | B1 | 5/2002 | Carmel et al. |
| 6,397,259 | B1 | 5/2002 | Lincke et al. |
| 6,438,123 | B1 | 8/2002 | Chapman |
| 6,453,355 | B1 | 9/2002 | Jones et al. |
| 6,477,580 | B1 | 11/2002 | Bowman-Amuah |
| 6,487,564 | B1 | 11/2002 | Asai et al. |
| 6,549,934 | B1 | 4/2003 | Peterson et al. |
| 6,557,031 | B1 | 4/2003 | Mimura et al. |
| 6,574,218 | B1 | 6/2003 | Cooklev |
| 6,621,870 | B1 | 9/2003 | Gordon et al. |
| 6,631,418 | B1 | 10/2003 | Watkins |
| 6,633,244 | B2 * | 10/2003 | Avery et al. .................. 341/60 |
| 6,760,378 | B1 | 7/2004 | Conklin |
| 6,763,178 | B1 | 7/2004 | Suzuki et al. |
| 6,763,390 | B1 | 7/2004 | Kovacevic et al. |
| 6,766,376 | B2 | 7/2004 | Price |
| 6,788,686 | B1 | 9/2004 | Khotimsky et al. |
| 6,801,947 | B1 | 10/2004 | Li |
| 6,806,909 | B1 | 10/2004 | Radha et al. |
| 6,823,394 | B2 * | 11/2004 | Waldvogel et al. ........... 709/231 |
| 6,847,618 | B2 | 1/2005 | Laursen et al. |
| 6,877,010 | B2 | 4/2005 | Smith-Semedo et al. |
| 6,879,559 | B1 | 4/2005 | Blackmon et al. |
| 6,888,848 | B2 | 5/2005 | Beshai et al. |
| 6,985,932 | B1 | 1/2006 | Glaser et al. |
| 6,990,497 | B2 | 1/2006 | O'Rourke et al. |
| 6,992,983 | B1 | 1/2006 | Chatterjee |
| 6,999,424 | B1 | 2/2006 | Kovacevic et al. |
| 7,003,570 | B2 | 2/2006 | Messinger et al. |
| 7,010,613 | B2 | 3/2006 | Connor |
| 7,035,287 | B2 | 4/2006 | Tourunen et al. |
| 7,046,672 | B2 | 5/2006 | Liao et al. |
| 7,058,728 | B1 | 6/2006 | Eklund |
| 7,061,936 | B2 | 6/2006 | Yoshimura et al. |
| 7,111,162 | B1 | 9/2006 | Bagepalli et al. |
| 7,133,922 | B1 | 11/2006 | She et al. |
| 7,136,377 | B1 | 11/2006 | Tweedly et al. |
| 7,149,811 | B2 | 12/2006 | Wise et al. |
| 7,149,813 | B2 | 12/2006 | Flanagin et al. |
| 7,154,895 | B1 | 12/2006 | Bornemisza et al. |
| 7,158,518 | B2 | 1/2007 | Burmeister et al. |
| 7,161,939 | B2 | 1/2007 | Israel et al. |
| 7,215,667 | B1 | 5/2007 | Davis |
| 7,224,703 | B2 | 5/2007 | Antal et al. |
| 7,266,118 | B2 | 9/2007 | Ido et al. |
| 7,324,500 | B1 | 1/2008 | Blackmon et al. |
| 7,330,902 | B1 | 2/2008 | Bergenwall et al. |
| 7,383,289 | B2 | 6/2008 | Kraft |
| 7,583,695 | B2 | 9/2009 | Vimpari et al. |
| 7,587,509 | B1 | 9/2009 | Edelman et al. |
| 7,836,124 | B2 | 11/2010 | Saxena et al. |
| 8,051,287 | B2 | 11/2011 | Shetty et al. |
| 2001/0004417 | A1 | 6/2001 | Narutoshi et al. |
| 2002/0021761 | A1 | 2/2002 | Zhang et al. |
| 2002/0055989 | A1 | 5/2002 | Stringer-Calvert et al. |
| 2002/0065926 | A1 | 5/2002 | Hackney et al. |
| 2002/0103815 | A1 | 8/2002 | Duvillier et al. |
| 2002/0116716 | A1 | 8/2002 | Sideman |
| 2003/0046431 | A1 | 3/2003 | Belleguie |
| 2003/0061369 | A1 | 3/2003 | Aksu et al. |
| 2003/0110286 | A1 | 6/2003 | Antal et al. |
| 2003/0115268 | A1 | 6/2003 | Esposito |
| 2003/0154239 | A1 | 8/2003 | Davis et al. |
| 2003/0187993 | A1 | 10/2003 | Ribot |
| 2003/0221014 | A1 * | 11/2003 | Kosiba et al. .................. 709/231 |
| 2004/0032424 | A1 | 2/2004 | Florschuetz |
| 2004/0098533 | A1 | 5/2004 | Henshaw et al. |
| 2004/0213291 | A1 | 10/2004 | Beshai et al. |
| 2004/0215803 | A1 | 10/2004 | Yamada et al. |
| 2006/0161516 | A1 | 7/2006 | Clarke et al. |

OTHER PUBLICATIONS

Chapter 6: What is Streaming Media and How does it Work?. RealNetworks. 1999. accessed Jul. 18, 2007. <http://service.real.comlhelp/player/plus manual. g2/htrnfiles/whatisrp .htrn.

"Common Multimedia Formats and Extentions". SorensonMedia. accessed Jul. 18, 2007. <http://www.sorensontech.comllearn/video_file_format.php>.

Quicktime Streaming Server Administrator's Guide. Apple Computer, Inc. 2002.

Schulzrinne, H. et al. "Real Time Streaming Protocol (RTSP)". The Internet Society. 1998.

"Truemotion VP7 Video Codec". On2 Technologies white paper. Jan. 10, 2005.

*Adobe Systems Incorporated* v. *Wowza Media Systems*, Inc., Case No. 4:2011cv02243 filed May 6, 2011, "Defendant-Counterclaim Plaintiff's Invalidity Contentions Under Patent L.R. 3-3", Feb. 2, 2012, 51 pages.

Adobe Systems Incorporated, "Adobe Flash Player 11.2.202.235", downloaded from the internet at: http://get.adobe.com/flashpiayer/, 1 page.

Adobe Systems Incorporated, "Macromedia Delivers Macromedia Flash Communication Server MX Breakthrough server unifies communications and applications to deliver live, human interactions on the Internet" http://www.adobe.com/macromedia/proom/pr/2002/flash_com_mx.html, Jul. 9, 2002, 7 pages.

Anderson, David et al., "A Continuous Media I/O Server and its Synchronization Mechanism," University of California at Berkeley, Oct. 1991, pub. IEEE 1991, pp. 51-57.

Archimedes Podule Loaders, downloaded from the internet at: http://www.chiark.greenend.org.uk/~theom/riscos/docs/PodLoader.txt, 1984, 15 pages.

Birk,Yitzhak, "Deterministic Load-Balancing Schemes for Disk-Based Video-on-Demand Storage Servers," Fourteenth IEEE Symposium on Mass Storage Systems, 1995 IEEE, pp. 17-25.

Casner, et al., Compressing IP/UDP/RTP Headers for Low-Speed Serial Links, RFC 2508, http://tools.ietf.org/html/rfc2508, Feb. 1999, 25 pages.

Chen, Herng-Yow, et al., "A Novel Multimedia Synchronization Model and Its Applications in Multimedia Systems," IEEE Transactions on Consumer Electronics, vol. 41, No. 1, Feb. 1995, pp. 12-22.

Crowcroft et al., "Internetworking Multimedia," UCL Press, Dec. 3, 1998, 292 pages.

Das, Amitabha, "A Model for Synchronisation and Communication of Distributed Multimedia Data Streams," IEEE Catalogue No. 95TH8061, 1995 IEEE, pp. 622-626.

Faulk, Stuart, et al., "On Synchronization in Hard-Real-Time Systems," Communications of the ACM, vol. 31, No. 3, Mar. 1988, pp. 274-287.

Greaves, David, et al., "ATM for Video and Audio on Demand," AES UK Audio for New Media Conference, UK 11th Conference: Audio for New Media (ANM), Mar. 1996, pp. 52-63.

Handley, M., GeRM: Generic RTP Multiplexing, Internet Engineering Task Force, Internet Draft, Nov. 11, 1998, 8 pages.

Haskin, R., "Tiger Shark—A scalable file system for multimedia," IBM Journal of Research and Development, Mar. 1998, 25 pages.

Herrtwich, Ralf Guido, et al., "A System Software Structure for Distributed Multimedia Systems," IBM European Networking Center, ACM SIGOPS European Workshop 1992, 5 pages.

Huang, Chung-Ming, et al., "Multimedia Synchronization for Live Presentation Using the N-Buffer Approach," 1995 IEEE, pp. 244-251.

Jacobson V., Compressing TCP/IP Headers for Low-Speed Serial Links, RFC 1144, Feb. 1990.

Jones, Alan, et al., "Handling Audio and Video Streams in a Distributed Environment," SIGOPS '93/12/93/N.C., USA, pp. 231-243.

Kim, Jae-Gon, et al., "Design and Implementation of an MPEG-2 Transport Stream Multiplexer for HDTV Satellite Broadcasting," IEEE Transactions on Consumer Electronics, vol. 44, No. 3, Aug. 1998, pp. 672-678.

Kim, Seong-Whan, et al., "MPEG-compliant joint source/channel coding using discrete cosine transform and substream scheduling for visual communication over packet networks", Journal of Electronic Imaging, vol. 10(1), Jan. 2001, pp. 329-338.

Lacas, Mark, et al., "The MediaLink Real-Time Multimedia Network," presented at the 95th Convention, Audio Engineering Society, Oct. 7-10, 1993, New York, 32 pages.

Leung, Wu-Hon, et al., "A Software Architecture for Workstations Supporting Multimedia Conferencing in Packet Switching Networks," IEEE Journal on Selected Areas in Communications, vol. 8, No. 3, Apr. 1990, pp. 380-390.

Macromedia Flash Player—Public Beta, © 1995-2002 downloaded from the internet at: hitp://web.archive.org/web/20020314193648/http:/www.macromedia.com/shockwave/download/beta/flashplayer6/.

MetaFilter Community Weblog, "Flash Player 6 Beta", downloaded from the internet at: http://www.metafilter.com/14365/Flash-Player-6-Beta, Feb. 1, 2002, 4 pages.

MIDI 1.0 Detailed Specification, Document Version 4.2, Revised Sep. 1995, The MIDI Manufacturers Association, Los Angeles, CA, 88 pages.

Peuker, "An Object-Oriented Architecture for the Real-Time Transmission of Multimedia Data Streams", downloaded from the internet at: http://scholar.googleusercontent.com/scholar?q=cache:AVOaWj1F-bMJ:scholar.google.com . . . on Sep. 6, 2011, 60 pages.

Rubin, Michael, "Droidmaker: George Lucas and the Digital Revolution,"© 2006, 3 pages.

Rumsey, Francis, Digital Audio Operations, Butterworth-Heinemann Ltd., 1991, 5 pages.

Rumsey, Francis, et al., Digital Interface Handbook, Third Edition, First published 1993, 3rd Edition 2004, 5 pages.

Salowey, J., et al., "Transport Layer Security (TLS) Session Resumption without Server-Side State," RFC 4507, The Internet Engineering Task Force (IETF), May 2006, 18 pages.

Stewart et al., Stream Control Transmission Protocol, RFC 2960, Oct. 2000, 135 pages.

Wikipedia, "Adobe Flash Player", downloaded from the internet at: http://en.wikipedia.org/wiki/Adobe_Flash_Player.

Yavelow, Christopher, Music & Sound Bible, IDG Books Worldwide, Inc., 1992, 14 pages.

* cited by examiner

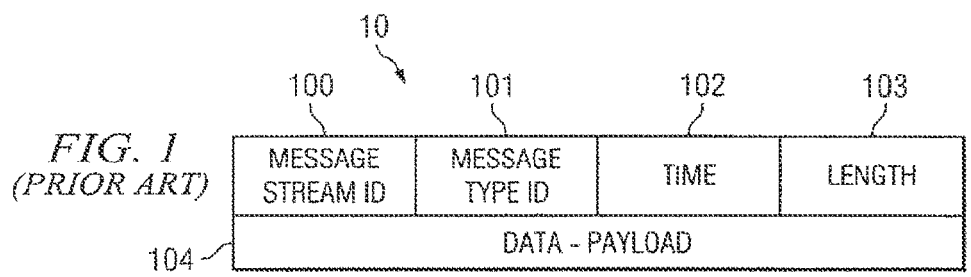
FIG. 1 (PRIOR ART)
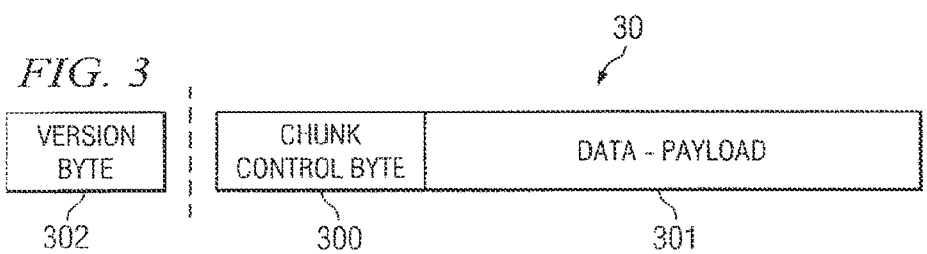
FIG. 2 (PRIOR ART)
FIG. 3
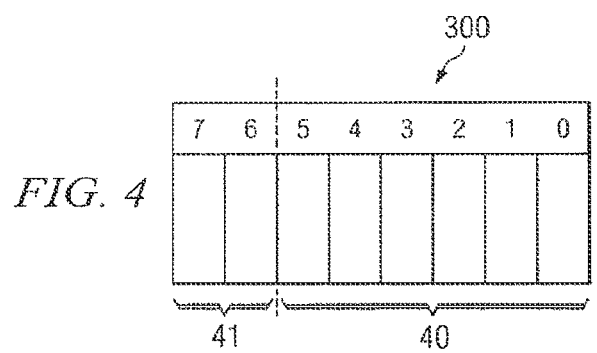
FIG. 4

FIG. 5A

| CHUNK | CHUNK STREAM ID | CHUNK TYPE | HEADER DATA | NUMBER OF BYTES AFTER HEADER | TOTAL CHUNK BYTES |
|---|---|---|---|---|---|
| CHUNK (500) | 4 | 0 | Δ: 20<br>L: 435<br>TYPE: 9<br>STREAM ID: 12346 | 128 | 139 |
| CHUNK (501) | 4 | 3 | <NONE> | 128 | 129 |
| CHUNK (502) | 4 | 3 | <NONE> | 128 | 129 |
| CHUNK (503) | 4 | 3 | <NONE> | 51 | 52 |

FIG. 5B

500 CHUNK — TYPE 0 →

| CHUNK TYPE | 0 |
|---|---|
| CHUNK ID | 4 |
| STREAM ID | 12346 |
| LENGTH | 435 |
| TYPE | 9 |
| Δ | 20 |

504 MESSAGE 307

FIG. 5C

501 CHUNK — TYPE 3 →

| CHUNK TYPE | 3 |
|---|---|
| CHUNK ID | 4 |
| STREAM ID | 12346 |
| LENGTH | 435 |
| TYPE | 9 |
| Δ | 20 |

504 MESSAGE 179

FIG. 5D

502 CHUNK — TYPE 3 →

| CHUNK TYPE | 3 |
|---|---|
| CHUNK ID | 4 |
| STREAM ID | 12346 |
| LENGTH | 435 |
| TYPE | 9 |
| Δ | 20 |

504 MESSAGE 51

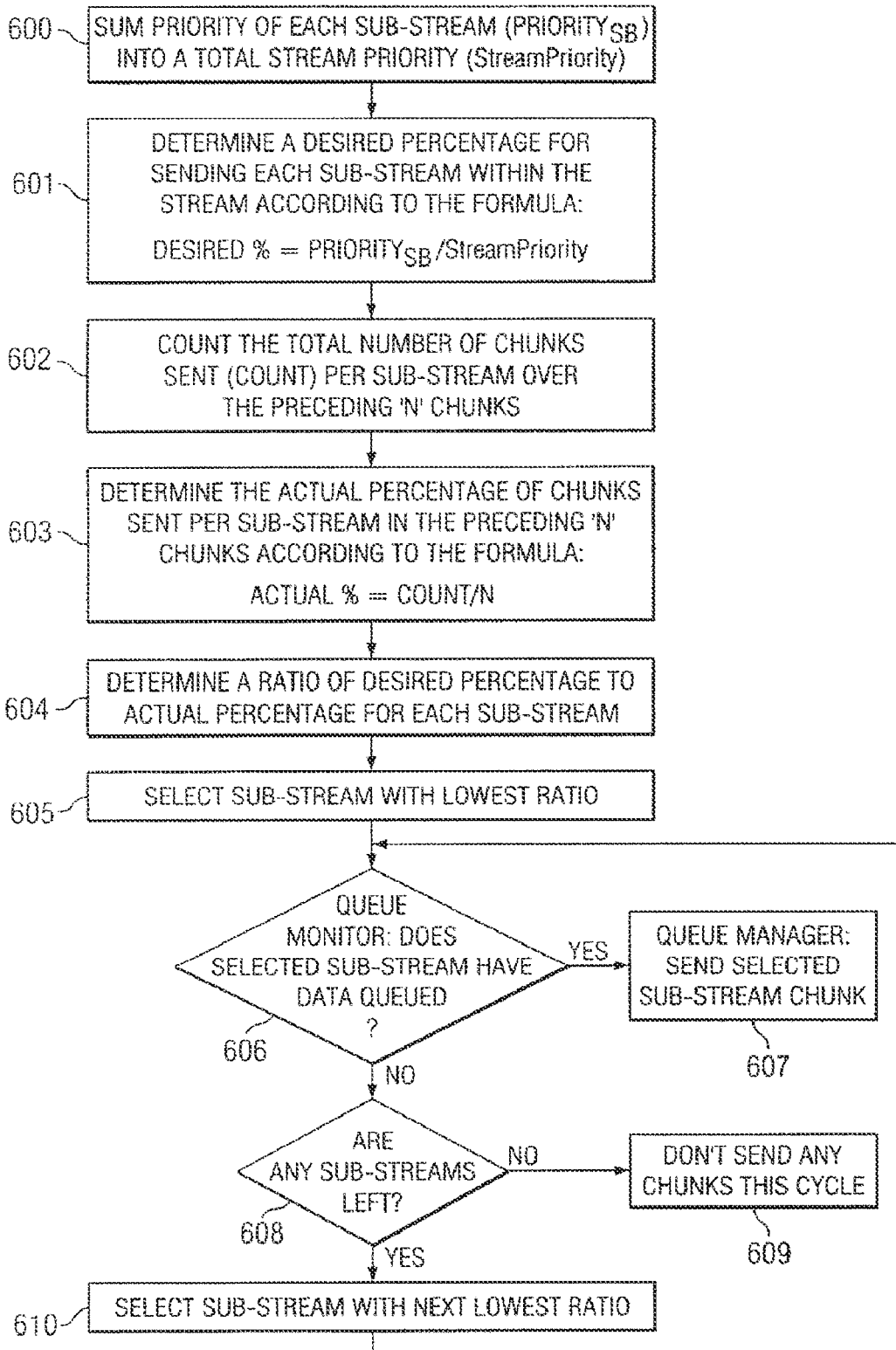

REAL-TIME PRIORITY-BASED MEDIA COMMUNICATION

CROSS-REFERENCE TO RELATED APPLICATIONS

The present application is a continuation of, and claims priority under 35 U.S.C. 120 to, commonly assigned, U.S. application Ser. No. 12/554,775 filed on Sep. 4, 2009, issued as U.S. Pat. No. 8,065,426 on Nov. 22, 2011, which is a continuation of, and claims priority under 35 U.S.C. 120 to, commonly assigned, U.S. application Ser. No. 11/841,517 filed on Aug. 20, 2007, issued as U.S. Pat. No. 7,587,509 on Sep. 8, 2009, which is a continuation of, and claims priority under 35 U.S.C. 120 to, commonly assigned, U.S. application Ser. No. 10/366,646 filed on Feb. 13, 2003, issued as U.S. Pat. No. 7,272,658 on Sep. 18, 2007, the disclosures of which are hereby incorporated herein by reference.

TECHNICAL FIELD

The present invention relates, in general, to media communications, and, more specifically, to a system and method for a real-time priority-based communication system.

BACKGROUND OF THE INVENTION

In the early years of the Internet, its primarily use was for the reliable transmission of data with minimal or no delay constraints. Transmission Control Protocol (TCP), of the TCP/Internet Protocol (IP) protocol suite, was designed for this type of delay-independent data traffic. TCP typically works well in this context where the reliability of the packet delivery is much more important than any packet delays. In order to achieve this reliability, TCP sets up a connection at both ends and attaches a header to each packet that contains the source and destination ports as well as the sequence number of the packet and other such administrative information. The destination typically receives a number of TCP packets before sending an acknowledgement to the source. If the acknowledgment fails, the source will generally presume the packets were lost and retransmit the "lost" packets. While this process ensures reliable delivery, packets may be delayed which, in multimedia streams, may cause noticeable and unacceptable degradation of quality in the multimedia playback.

An alternative transmission protocol in the TCP/IP protocol suite is User Datagram Protocol (UDP). Unlike TCP, UDP is connectionless and unreliable, meaning that it does not establish a connection at both ends and does not include a resource for resending lost packets. Instead, the UDP packets are sent out with a packet header that typically includes only the source and destination ports along with a 16-bit segment length and 16-bit checksum for minimal error detection. Because UDP does not include the additional administrative information, it generally makes no delivery guarantees, offers no flow control, and performs only minimal error detection. As such, UDP has useful timing characteristics for real-time audio or video transmission, where the delivery of every packet is not as important as the timely delivery of packets. UDP was generally used as the early transport protocol for real-time multimedia applications because it typically offers these beneficial characteristics for delay-sensitive data delivery. However, by itself, UDP usually does not provide any general purpose tools that may be useful for real-time applications.

In response to the limitations of UDP, Real-time Transport Protocol (RTP) was developed to operate as a thin layer on top of UDP to create a generalized multipurpose real-time transport protocol. An RTP fixed header may generally include: a 7-bit payload type field for identifying the format of the RTP payload; a 16-bit sequence number which is incremented by one for each subsequent RTP data packet transmitted; a 32-bit timestamp that corresponds to the time that the first RTP data packet was generated at the source; a 32-bit synchronization source identifier which is a randomly generated value that uniquely identifies the source within a particular real-time session; as well as other administrative information. With this information, RTP provides support for applications with real-time properties including timing reconstruction, loss detection, security, and content identification without the reliability-induced delays associated with TCP or the lack of timing information associated with UDP.

Real-Time Control Protocol (RTCP) works in conjunction with RTP to provide control support to the application for maintaining the RTP session. RTCP generally performs four functions: (1) providing information to the application regarding the quality of transmission, such as number of packets sent, number of packets lost, interarrival jitter, and the like; (2) identifying the RTP source through a transport-level identifier, called a canonical name (CNAME), to keep track of the participants in any particular RTP session; (3) controlling the RTCP transmission interval to prevent control traffic from overwhelming network resources; and (4) conveying minimal session control information to all session participants. The RTCP packets are typically transmitted periodically by each participant in an RTP session to all other participants. Therefore, RTCP provides performance and diagnostic information that may be used by the application.

One of the major problems associated with streaming multimedia information arises in attempting to stream the media through firewalls, Network Address Translation (NAT) devices, and the like. The major purpose of firewalls is to prevent unauthorized and/or hostile access to a computer system or network. As such, firewalls are generally configured with strict rules specifying specific, static ports through which desired and/or authorized data traffic can pass, while blocking undesirable data. The majority of all IP protocols use RTP for transporting the media streams. RTP is built over UDP, which generally has no fixed ports associated with it. Thus, there is no guarantee that a port associated with the incoming RTP/UDP stream will be allowed through the firewall. Moreover, each media stream typically has multiple channels, which generally requires its own opening through the firewall. This means that for the media stream to traverse the firewall, the firewall will have to open many UDP openings for each call session, which defeats the purpose for the firewall in the first place.

NAT devices are used to translate an IP address used within one network to a different IP address known within another network. NAT devices typically maintain a map of addresses within an "inside" network. Any communications directed to users within the inside network usually pass first through the NAT device for translation to the inside address. Thus, users within the inside network may see out, but outside users can only typically communicate with the inside users through the NAT device's translation. NAT devices may allow a network to support many more users or clients than it has fixed IP addresses. The NAT device may be addressed from the outside using the few fixed IP addresses, yet service many other address within the inside network.

Another problem with the existing streaming protocols is the amount of header information attached to any given piece of data on the stream. As mentioned above, UDP and TCP messages contain considerable header information concerning the timing, sequence, data type, and the like. Because multiple streams are typically running at once, each piece of data generally has a stream ID to tell the destination which stream any particular piece of data belongs to. In a situation where an audio stream is established where the message type is constant for a period of time and the formatting of the message type requires a constant number of bits per message, the header information on the type, length, and the like congests the stream with useless information, thus taking away from the maximum available data bandwidth.

BRIEF SUMMARY OF THE INVENTION

Representative embodiments of the present invention are directed to a real-time priority-based communication system for communicating media streams made up of multiple media message sub-streams, the communication system comprising a chunk configurator for dividing media message sub-streams into chunks, a state machine configured to translate between information regarding the media message sub-streams and the chunks and state associations to the information, the state associations written into a header for each of the chunks, a queue for holding the chunks waiting to be transmitted, and a processor for executing a scheduling algorithm, wherein the scheduling algorithm determines ones of the chunks in the queue to transmit next.

Additional representative embodiments are directed to a method for communicating media streams, comprised of a plurality of sub-streams, in a real-time priority-based communication protocol, the method comprising dividing each one of the plurality of sub-streams into a plurality of chunks, assigning states to each of the plurality of chunks representative of information regarding the associated sub-streams and the associated media streams, writing the states into a header of each of the plurality of chunks, queuing the plurality of chunks for transmission, and transmitting ones of the plurality of chunks according to a scheduling algorithm.

Further representative embodiments are directed to a computer program product having a computer readable medium with computer program logic recorded thereon, the computer program product comprising code for breaking down each one of a plurality of media sub-streams making up a message stream into a plurality of associated chunks, code for implementing a state machine that processes state assignments for each of the plurality of associated chunks representative of information regarding the media sub-streams and the message streams, code for writing the state assignments into a header of each of the plurality of associated chunks, code for building a queue for the plurality of associated chunks waiting for transmission, and code for transmitting ones of the plurality of associated chunks according to a scheduling algorithm.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is a conceptual block diagram illustrating a data packet which is part of a typical media stream;

FIG. 2 is a conceptual block diagram illustrating a typical message stream comprising multiple message packets;

FIG. 3 is a conceptual block diagram illustrating one example embodiment of a chunk configured according to the real-time priority-based communication system of the present invention;

FIG. 4 is a conceptual block diagram detailing a chunk control byte;

FIG. 5A is a conceptual block diagram illustrating a chunk stream comprising multiple chunks;

FIG. 5B is a block diagram illustrating a state machine configured for a representative embodiment of a real-time priority-based communication system, as described herein, receiving a Type 0 chunk;

FIG. 5C is a block diagram illustrating a state machine configured for a representative embodiment of a real-time priority-based communication system, as described herein, receiving a Type 3 chunk;

FIG. 5D is a block diagram illustrating a state machine configured for a representative embodiment of a real-time priority-based communication system, as described herein, receiving a Type 3 chunk;

FIG. 6 is a flowchart disclosing representative steps of an example scheduling algorithm used in representative embodiments of the present invention;

DETAILED DESCRIPTION OF THE INVENTION

Figure 5E:
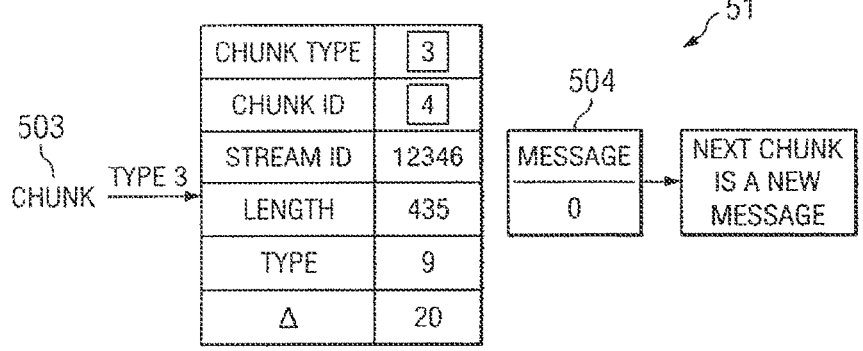
FIG. 5E is a block diagram illustrating a state machine configured for a representative embodiment of a real-time priority-based communication system, as described herein, receiving a Type 3 chunk.

Before beginning a discussion of the various embodiments of the present invention, it may be helpful to review how media streams are carried through transmission.

FIG. 1 is a conceptual block diagram illustrating data packet 10 which is part of a media stream. Data packet 10 not only comprises data—payload 104, but also comprises header information that is used to assemble and play the media stream at the destination entity. The header information typically comprises message stream ID 100, message type ID 101, time 102, and length 103. Message stream ID 100 identifies the particular stream that data packet 10 is a part of. In a typical multimedia application, such as an audio/video conference, for example, the outgoing stream may be a first stream, while the outgoing video stream may be a second stream. There are possible scenarios that include a large number of streams and sub-streams going back and forth to the different participants over a single connection. In a typical application a media stream is comprised of multiple media message sub-streams that make up the different aspects of the main media stream. In order to deal with the many different streams, each stream is designated with a unique ID, such as message stream ID 100. Thus, when data packet 10 enters the destination, the media application reads message stream ID 100 and assembles data packet 10 into the appropriate message stream. In a typical application, media stream ID 100 may comprise a 32-bit designator.

The header information may also comprise message type ID 101. Message type ID 101 identifies the specific format of data packet 10. For example, message type ID 101 may identify data packet 10 as an audio data format (or a particular type of audio data format, such as a wave data format (.wav), MP3, and the like), a video data format (or a particular type of video data format, such as a motion picture experts group (MPEG)-2 or -4, a MICROSOFT™ WINDOWS MEDIA AUDIO™ (.wma), and the like), or a pure data format. By designating the type of data format, the destination application will likely know how to play or display the incoming media stream.

Because a media stream generally comprises a group of packets transmitted over some network, it is important for the destination application to be able to assemble and play the data packets in order and according to the timing of the original image/media. Therefore, the header information also includes time 102, which is typically a time stamp for the recording or sampling of the particular packet. The destination application may use time 102 to synchronize each of the packets that it receives in the stream. The application will then know to play a packet with time 102 designating 1020 before a packet with time 102 designating 1040. The time stamp may be a real-time, start time, or the like. The purpose is to determine when the message occurred so that things may be synchronized later during broadcast or playback.

Length 103 is also a typical piece of header information that identifies the length of data packet 10. By designating the specific length of data packet 10, the destination application knows when the current data packet or media message has been fully received.

It may often be the case where a message stream carries data packets in which message stream ID 100, message type ID 101, and length 103 may be the same value. Where packets are received consecutively, message stream ID 100 should generally be the same. Furthermore, if the stream is an audio stream, for example, message type ID 101 should also generally be the same. Length 103 can vary to some extent, however, some media formats, such as constant bit-rate MP3, Nellymoser, and the like, may divide all packets into the same length. Therefore, in such cases, length 103 will also be the same for each packet.

FIG. 2 is a conceptual block diagram illustrating typical message stream 20 comprising message packets 21-24. Message packet 21 begins with the header information: message stream ID 100 of 12345, message type ID 101 of 8 (for audio), time 102 of 1000, and length 103 of 32 bytes. This header information is important for the destination application to associate the message packets with the correct stream and play them in the right manner and in the right order. Message packet 22 also includes the header information: message stream ID of 12345, message type ID 101 of 8, time 102 of 1020, and length 103 of 32 bytes. As may be seen in FIG. 2, message packet 22 contains much of the same header information as message packet 21. In fact, the only difference in the two message packets is the time stamp of time 103; message packet 21 has time 103 of 1000, while message packet 22 has time 103 of 1020. A difference of 20 seconds. Message 23 and 24 also comprise the same information for the header information of message stream ID 100, message type ID 101, and length 103, with time-stamps, time 102, differing by exactly 20 seconds per packet. The repeated information in message packets 21-24 clogs the available bandwidth of the entire system.

In an ideal system, it would be most efficient to send a data payload without any header information. However, without header information, it is practically impossible to assemble and playback data packets in a media stream with the current technology, let alone do so efficiently. FIG. 3 is a conceptual block diagram illustrating one example embodiment of chunk 30 configured according to the real-time priority-based communication system of the present invention. A c-hunk is a piece of a message stream that has been broken down or divided by a chunk configurator or some other message processing Chunk 30 comprises chunk control byte 300 and data payload 301. Chunk control byte 300 preferably contains much of the header-type information necessary for managing the chunk stream.

It should be noted that in additional embodiments of the present invention, version byte 302 may be written/transmitted to provide information on the particular version of the transport protocol being used. The inclusion of this information usually allows easier maintenance of future protocol versions and backwards compatibility. In operation, only a single version byte would likely be necessary per connection. Therefore, version byte 302 would likely not add any overhead on a per chunk basis.

In attempting to reduce the overhead of stream messages, certain assumptions may be leveraged into bandwidth savings. One such assumption involves the necessity of a 32-bit message stream ID. Statistically, there are usually less than sixty-one (61) message streams (having unique message stream IDs) in a server at any given time for any given client. Sixty-one (61) message streams may be uniquely represented in only 6 bits. Thus, having a 32-bit message stream ID is typically a waste of space. FIG. 4 is a conceptual block diagram detailing chunk control byte 300. Chunk control byte 300 comprises a chunk identifier, such as chunk stream ID 40 and chunk type ID 41. While the statistics suggest that there are a maximum of sixty-one (61) message streams in a server at any one time for a particular client, artificially limiting the maximum number of streams does not present itself as an efficient means for obtaining bandwidth at the expense of stream capacity. Instead, chunk stream ID 40, as configured according to the embodiment illustrated in FIG. 4, provides a mechanism for supporting 65,597 total simultaneous streams (using a range of 3 to 65,599).

Chunk stream ID 40 comprises bits 0-5 of chunk control byte 300. As provided in Table 1, when the value of chunk stream ID 40 lies between 3 and 63 in certain embodiments of the present invention, chunk stream ID 40 is assigned at face value. Statistically, this situation will occur most often, resulting in a 6-bit chunk stream ID. However, when the value of chunk stream ID 40 is 0 in certain embodiments of the present invention, a second byte is added to chunk stream ID 40 that represents the range of 64 to 319. When the value of chunk stream ID is 1 in certain embodiments of the present invention, two additional bytes, a second byte and a third byte, are added to chunk stream ID 40 that represent the range of 320 to 65,599. Therefore, the embodiment illustrated in FIGS. 3 and 4 supports up to 65,597 streams, while still conserving bandwidth on a statistically large number of messages. A chunk stream ID 40 value of 2 in certain embodiments of the present invention represents that the chunk contains a low-level protocol message, which are used to control administrative aspects of the embodiment illustrated in FIGS. 3 and 4.

TABLE 1

CHUNK STREAM ID
(BITS 0-5 OF CHUNK CONTROL BYTE)

| Value | Meaning of Value |
|---|---|
| 3-63 | Chunk Stream ID is the face value of 3-63. |
| 0 | There is another byte that represents the range 64-319 (Second byte + 64). |
| 1 | There are two more bytes representing the range 320-65,599 ((Third byte)*256 + (Second byte + 64)). |
| 2 | The Chunk is a Low-Level Protocol Message. |

The configuration of the real-time priority-based protocol illustrated in FIGS. 3 and 4 advantageously leverages the statistical maximum of sixty-one (61) streams. Because there are usually less than sixty-one (61) streams in the server at any given time for a client, only the 6 bits of chunk stream ID 40 will generally be sent. Thus, the 32-bit header for message stream IDs of the current technologies is preferably reduced to only 6 bits for the majority of data streams. In rare cases, in which the number of streams exceeds 61, the additional bytes of information may be included to support those extra streams.

The configuration of chunk stream ID 40 in certain embodiments of the present invention, as provided in Table 1, demonstrates implementation of a state machine having different state associations using its first 2 bits to address many different levels of streams. In furtherance of the state machine concept implementing the embodiments of the present invention, chunk type ID 41 provides four states/types for classifying each chunk message. Unlike the media type indicator of message type ID 101 (FIG. 1) that identifies the format of the data payload, chunk type ID 41 identifies the type or purpose of the chunk.

As provided in Table 2, bits 6 and 7 of chunk control byte 300 comprise chunk type ID 41. When the value of chunk type ID 41 is 0 in certain embodiments of the present invention, the chunk state or type indicator is a new/reset message type (Type 0) or indicates a new stream. This signifies the first message sent on the chunk stream in certain embodiments of the present invention. As is described in Table 2, a Type 0 message may comprise additional bytes of information that include the typical header information of the current stream methods, such as message length, message type ID, and message stream ID. Instead of using a timestamp, however, the embodiment of the present invention illustrated in FIGS. 3 and 4 uses a time delta (Δ), or the change in time from the previous message. The time-delta (Δ) is essentially an absolute time because it is usually added to '0' time. Because the Type 0 chunk includes a considerable amount of information, it will generally be larger than the subsequent chunks in the stream.

When the value of chunk type ID 41 is 1 in certain embodiments of the present invention, the chunk state or type is a new media indicator of a specified new time change/time delta, length, and any new message type ID (Type 1). This state may signify a new chunk that is measured using the new specified time delta (i.e., the time stamp change from the last message) and the specific length. Thus, a subsequent message in a chunk stream that belongs to the same chunk stream ID, but that is a different type/format and a different time delta than the previous chunk only has to include header information on the message type ID, time delta, and the length. A Type 1 chunk may, therefore, have fewer bytes of header information than the Type 0 chunk, because the state machine implementing the illustrated embodiment of the present invention has been set with certain information by the Type 0 chunk that remains unchanged for the Type 1 chunk.

A value for chunk type ID 41 of 2 in certain embodiments of the present invention represents the chunk state or type for a new message defined only by a single piece of header information, such as the time delta (Type 2) in a new time indicator. A Type 2 chunk preferably has all of the same information from the previous chunk except possibly for a change in the time delta. Therefore, the state machine may only need to use the new time delta to change to the proper new state.

The least amount of overhead or header information in the representative embodiment illustrated in FIGS. 3 and 4 accompanies the Type 3 chunk in certain embodiments of the present invention, when the value of chunk type ID 41 is 3. A Type 3 chunk is a continuation indicator. A continuation indicator chunk preferably uses the same message stream ID, the same message type ID, the same time change/time delta, and the same length of the previous chunks. Therefore, the state machine implementing this embodiment of the present invention is preferably already set to the appropriate state. One design goal may be to optimize the streaming process to get the chunks to Type 3 chunks as soon as possible. Therefore, Type 3 chunks that are essentially continuations of a same message are transmitted with a 0-length header.

The 0-length header of the Type 3 chunks is especially interesting when the Type 3 chunk represents the beginning of a new message. This scenario may occur when two consecutive chunks use the same message stream ID, the same message type ID, the same time change/time delta, and the same length as the previous chunk. In this case, a new message is enabled without any required header information, a 0-length header.

TABLE 2

CHUNK TYPE
(BITS 6-7 OF CHUNK CONTROL BYTE)

| Chunk Type Bits | Description |
|---|---|
| 00 | (Type 0) Begin new message. Reset all information. Type 0 is used when the time moves backwards or for the first message sent on the chunk stream. A Type 0 chunk message resets the time to 0 before adding the supplied time delta (Δ). A Type 0 chunk message will contain the following header information:<br>3 bytes - message time delta (Δ)<br>3 bytes - message length<br>1 byte - message type ID<br>4 bytes - message stream ID |

TABLE 2-continued

CHUNK TYPE
(BITS 6-7 OF CHUNK CONTROL BYTE)

| Chunk Type Bits | Description |
|---|---|
| 01 | (Type 1) Begin new message using specified Δ, new length, and/or new message type ID. A Type 1 chunk message will generally contain the following header information:<br>3 bytes - Δ<br>3 bytes - new message length<br>1 byte - message type ID |
| 10 | (Type 2) Begin new message using specified Δ. A Type 2 chunk message will generally contain the following header information:<br>3 bytes - Δ |
| 11 | (Type 3) Continuation (possibly start new message). A Type 3 chunk message will generally contain no header information, but just the raw data/payload. |

FIG. 5A is a conceptual block diagram illustrating chunk stream 50 comprising chunks 500-503. Chunk 500 is a Type 0 chunk with a chunk stream ID of 4. Because chunk 500 is a Type 0 chunk, it includes additional header data 504. The additional data includes the message stream ID (12346), the message type ID (9), the message length (435), and the time delta (20). This header information is set into the state machine of the present invention. Chunk 501 is a Type 3 chunk belonging to the same chunk stream ID 4. Because chunk 501 belongs to the same media stream ID and is the same type and length as chunk 500, the state set by the extra header information of chunk 500 already defines how to handle chunk 501. According to the teachings of the present invention, chunk 501 only needs to designate the chunk stream ID and chunk type. Therefore, only a single byte of overhead is added to the data payload of chunk 501. Chunks 502 and 503 are also Type 3 continuation chunks that require only an additional byte of header information to adequately handle those chunks.

FIG. 5B is a block diagram illustrating state machine 51 configured for a representative embodiment of a real-time priority-based communication system, as described herein, receiving a Type 0 chunk. State machine 51 sees that chunk 500 is a Type 0 chunk and expects each of the state variables to be set with the header information contained in chunk 500. In some embodiments, state machine 51 may also include message count 504 that keeps track of the progress of each receiving message. Chunk 500 brings 128 bytes of data payload. Therefore, using the message length parameter, state machine 51 can subtract 128 bytes from the total length, 435 bytes, to hold the remaining message expected length of 307 bytes in message 504. The state machine illustrated in FIG. 5B is used in both the send direction and the receive direction. As chunks arrive at the receiver system, the state machine is used in reverse to translate the state assignments necessary to play the data stream chunk. Therefore, the state machine for the real-time priority-based communication system may be located at least at the sending entity and the receiving entity.

FIGS. 5C-5E are block diagrams illustrating state machine 51 receiving Type 3 chunks. In FIG. 5C, state machine 51 reads that chunk 501 is a Type 3 chunk, and therefore, expects that only the chunk type and chunk stream ID state variables will be changed. Because chunk 501 could belong to a different sub-stream than that of chunk 500, the chunk stream ID is used in the Type 3 continuation chunks. The remaining state variables set by chunk 500 remain the same. Message 504 is changed again to reflect the 128 bytes of payload data delivered by chunk 501. 179 bytes now remain in the message. In FIG. 5D, state machine 51 reads that chunk 502 is also a Type 3 chunk, and therefore, also expects that only the chunk type and chunk stream ID state variables will be changed. The remaining state variables set by chunk 500 continue remain the same. Message 504 is again changed to reflect the 128 bytes of payload data delivered by chunk 501. 179 bytes now remain in the message. FIG. 5E also illustrates state machine 51 receiving a Type 3 continuation chunk. With this receipt, because state machine 51 knows the maximum chunk data payload length is 128, state machine 51 knows that this will be the last chunk for this particular message, as reflected in message 504 zeroing out. The next chunk will, by process of elimination, have to be for a new message (or be a low-level protocol message).

When compared to the header information included with each data packet in media stream 20 (FIG. 2), instead of resending the same header with each data packet, the teachings of the present invention preferably allow this information to be sent only once, with subsequent chunks leveraging the state machine in order to reduce the overhead sent with each subsequent chunk. The amount of repetitive information is, therefore, favorably reduced, increasing the available bandwidth over the connection.

Referring back to Table 1, when the value of chunk stream ID 40 is 2, in certain embodiments of the present invention, the state is designed to change for the system to expect a low-level protocol message. Table 3 describes two low-level protocol messages that may be implemented into various embodiments of the present invention. In such embodiments, a message ID of 1 represents a change to the maximum chunk size. The parameter passed with such a message ID may be an integer representing the size for all future chunks. Another message ID, shown as message ID 2 in Table 3, may allow for an abort signal to be sent to the network corresponding to a particular chunk stream ID. For example, if a communication session is in mid-stream when the transmitting end shuts-down, or other such event, the abort message would generally inform the network that it should not expect any further chunks, thus, aborting the stream. Many other optional low-level protocol messages may also be provided for in various embodiments of the present invention. The two messages provided for in Table 3 are merely examples.

TABLE 3

LOW-LEVEL PROTOCOL MESSAGES

| Message | Message ID | Message Data | Description |
|---|---|---|---|
| Set Chunk Size | 1 | 4 bytes representing an integer. Bytes are sent in "network" order (i.e., order of significance) | The integer represents the new maximum chunk size for all future chunks. |
| Abort Message | 2 | 4 bytes representing an integer. Sent in "network" order. | The integer represents a chunk stream ID. If that chunk stream is currently waiting to complete a message (i.e., expecting more chunks). The message stream is aborted. |

The embodiments of the present invention obtain benefits from breaking the individual messages further down into chunks. While it may appear more simple to send one message and then the next, a linear process, such as this, is actually much less efficient. A stream representing some media presentation may be comprised of several different sub-streams. One sub-stream may be for the audio, one for the video, and another for data. The combination of each of these sub-streams makes up the entire streaming presentation. Therefore, it becomes important to coordinate smooth delivery of each of the sub-streams to facilitate the smooth playback of the entire stream. For example, a video key frame may have a large amount of data, 20 k-30 k bytes, in contrast to audio messages that are generally very small. However, the audio messages are much more time sensitive than the video messages due to the idiosyncrasies of human hearing. Therefore, if an audio message is sent from the audio sub-stream, followed by a very large video message from the video sub-stream, followed by the next audio message, the audio stream may typically stall because the next audio message simply may not arrive in time.

In operation, the larger video messages are typically much less frequent, even though they may be much larger. Therefore, interleaving other messages in between the video messages is acceptable as long as the video message eventually arrives in time for the smooth playback of the video sub-stream. Considering this balancing process, breaking the messages into chunks that may be more easily balanced and interleaved increases the efficiency of the streaming. While no one maximum chunk size is best for all situations, a given maximum may be beneficially set in which the video and data messages arrive without too much effect on the timely arrival of the audio chunks.

In certain embodiments of the present invention, the maximum chunk size is set to correspond to the complete length of a standard audio message in the audio sub-streams in order to ensure timely delivery of the complete audio message. For example, the sampling rate for the audio compression algorithm, Nellymoser, is typically 8 kHz. The 8 kHz sampling typically generates messages that are 128 bytes long. Therefore, in certain embodiments of the present invention that may use the Nellymoser compression algorithm, the maximum chunk size may preferably be set to 128 bytes. Other audio compression formats may produce messages that are either greater than or less than 128 bytes. In such cases, a low-level protocol message could be used to change the maximum chunk size of the applicable embodiments of the present invention to ensure an optimal efficiency algorithm.

Balancing the transmission of the chunks in the different media sub-streams is preferably controlled by a scheduling algorithm that directs which chunk of which stream or sub-stream to send next. Each type of media may preferably be assigned a specific priority value. For example, because audio messages are the most sensitive, they may be assigned the highest priority value. Video and data messages would each likely be assigned lower priority values. FIG. 6 is a flowchart disclosing representative steps of scheduling algorithm 60 used in representative embodiments of the present invention. In step 600, the priority of each sub-stream (PrioritySB) is summed into a total stream priority (StreamPriority). In step 601, a desired percentage for sending each sub-stream within the stream according to formula (1):

$$\text{Desired \%} = \text{PrioritySB}/\text{StreamPriority} \tag{1}$$

The total number of chunks sent (count) are counted per sub-stream over the preceding 'N' chunks in step 602. 'N' represents a scheduling sampling window that may be pre-set by a user or developer. In step 603, the actual percentage of chunks sent per sub-stream in the preceding 'N' chunks is developed according to formula (2):

$$\text{Actual \%} = \text{count}/N \tag{2}$$

In step 604, a ratio of desired percentage to actual percentage is determined for each sub-stream. A selection criteria, which selects the sub-stream with lowest ratio is executed in step 605. In step 606, a queue monitor searches or determines whether the selected sub-stream has a chunk queued. In step 607, if a chunk is queued for the selected sub-stream, a queue manager selects the sub-stream chunk to send. If no data is queued for the selected sub-stream, the determination is made whether there are any other waiting sub-streams left, in step 608. If there are no remaining sub-streams, then no chunks are sent in the cycle, in step 609. However, if there are remaining sub-streams, a new sub-stream is selected, in step 610, that has the next lowest ratio of desired to actual percentages. Steps 606-610 are repeated until all chunks in each sub-stream are sent.

Scheduling algorithm 60 preferably results in a favorable balance of streams. If all sub-streams always have data to send, not only does scheduling algorithm 60 provide for those streams to obtain the proper percentage of chunks sent, but also provides a good interleaving mix over the scheduling window. When some sub-streams do not have data or, at least, do not have data queued, scheduling algorithm 60 allows the lower priority sub-streams to use a greater bandwidth. Thus, bandwidth use is routinely optimized. One embodiment of the present invention may achieve desired results with audio having a priority of 100, data priority of 10, and video priority of 1. However, other various priority assignments may prove better for different situations and known or expected data types or data loads.

Figure 7A:
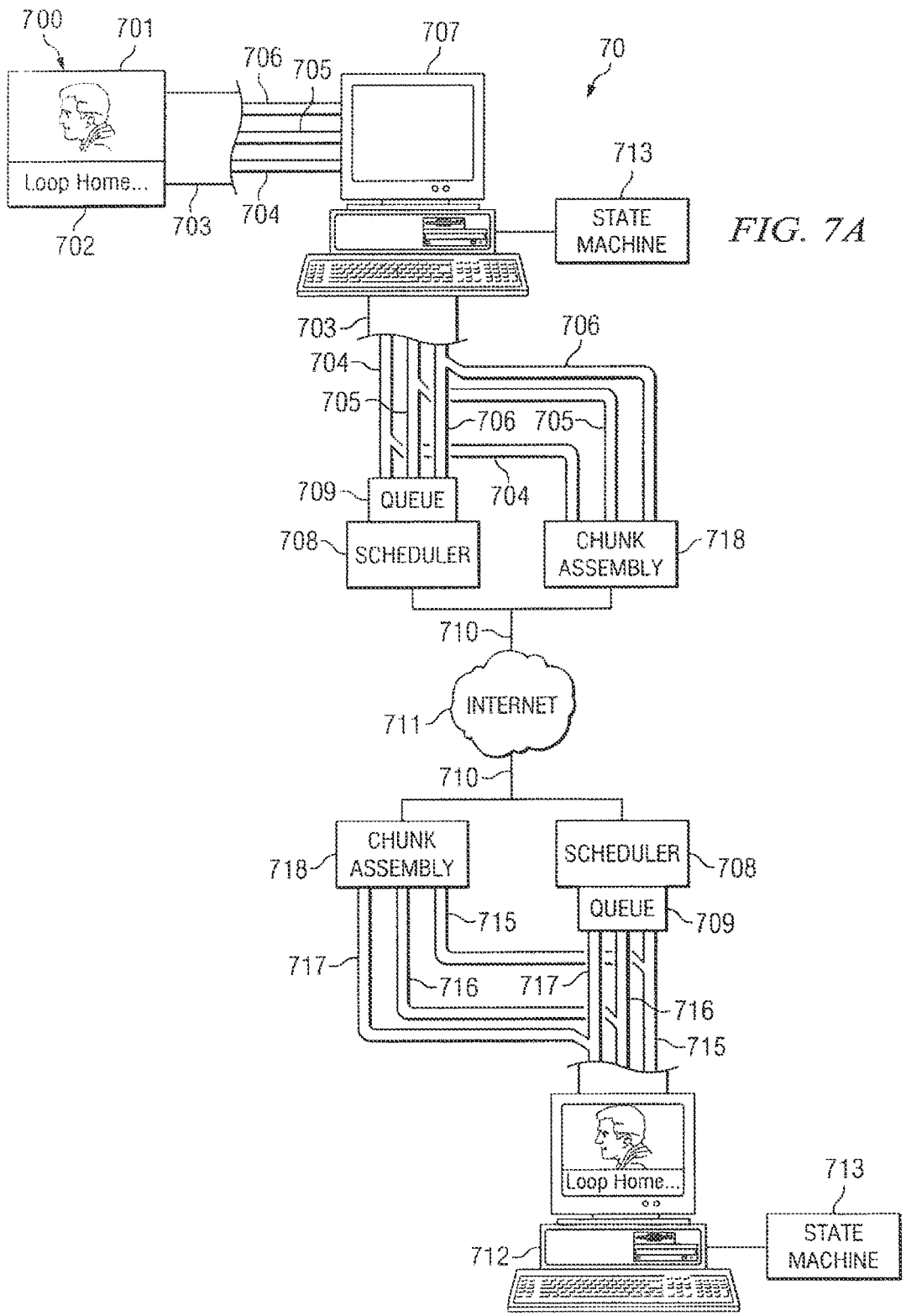
FIG. 7A is a conceptual block diagram illustrating a real-time communication system configured using a representative embodiment of the real-time priority-based protocol of the present invention in a peer-to-peer application.

FIG. 7A is a conceptual block diagram illustrating real-time communication system 70 configured using a representative embodiment of the real-time priority-based protocol of the present invention. Stream presentation 700, which may include video sub-stream 704 for providing visual rendering 701, data sub-stream 705 for providing data visual 702, and audio sub-stream 706 for supporting the audio for visual rendering 701, is intended to be streamed from computer 707 to client 712 in a peer-to-peer application. Stream 703 includes each of video, data, and audio sub-streams 704-706. Computer 707, which includes a processor capable of running the real-time priority-based protocol described herein, breaks the video, data, and audio messages into chunks according to a maximum chunk size preferably set to accommodate the sampling rate of the audio information. As video, data, and audio sub-streams 704-706 are broken into the appropriated chunk size, the necessary header information is placed on each chunk according to the teachings described herein at state machine 713. The chunks are then queued in chunk queue 709 awaiting the determination of which chunks to send. Sub-queues for audio, video, and data chunks may each be maintained for more efficient determinations of the chunks. Scheduler 708 implements a scheduling algorithm, such as scheduling algorithm 60 (FIG. 6), to schedule and prioritize the transmission of each of the chunks for the different sub-streams.

It should be noted that if a stream were being received by computer 707 instead of transmitting the stream, chunk assembly 718 would be used to assemble the received chunks into the resulting message stream.

The example embodiment shown in FIG. 7A also includes single socket connection 710 between Internet 711 and both of computer 707 and client 712. Scheduler 708 controls which chunks are sent in order to accommodate delivering stream 703 to client 712, in such a manner that a user at client 712 may view, in real-time, stream presentation 700 with a minimum amount of interference or disturbance in the playback over single socket connection 710. As the data chunks are received, chunk assembly 718 on client 712 operates with instructions from state machine 713 within client 712 to reassemble the received chunks into presentation stream 714 with video, audio, and data sub-streams 715-717. It should be noted that instances of state machine 713 are preferably included in each entity compatible with the real-time, priority-based communication system of the present invention. Furthermore, if client 712 were transmitting the message stream instead of receiving the chunk stream, queue 709 and scheduler 708 on client 712 would be used to transmit the chunks associated with the message stream.

Figure 7B:
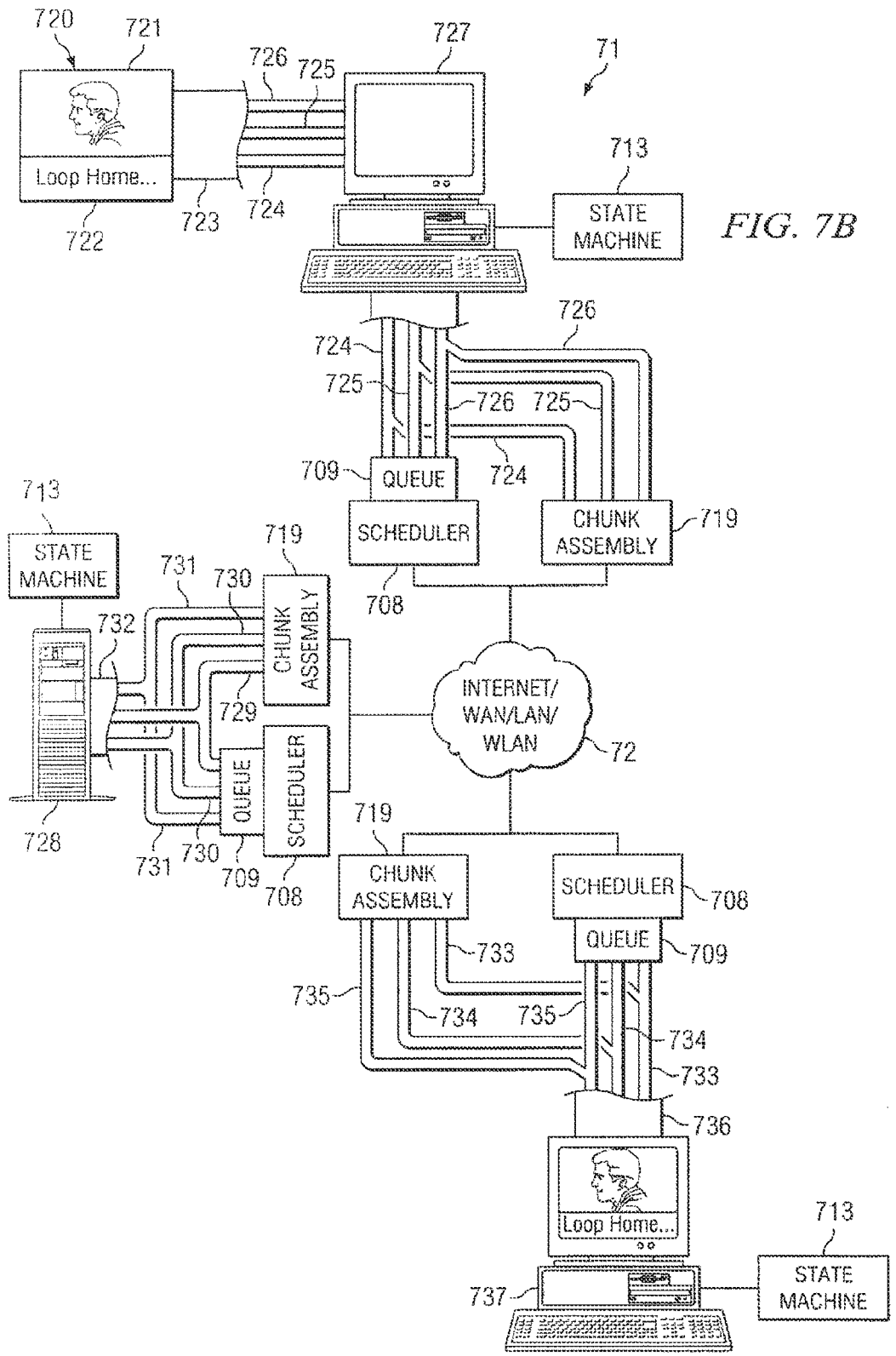
FIG. 7B is a conceptual block diagram illustrating a real-time communication system configured using a representative embodiment of the real-time priority-based protocol of the present invention in a client-server application.

FIG. 7B is a conceptual block diagram illustrating real-time communication system 71 configured using a representative embodiment of the real-time priority-based protocol of the present invention in a client-server application. Similar to the example shown in FIG. 7A, stream presentation 720, which may include video sub-stream 726 for providing visual rendering 721, data sub-stream 725 for providing data visual 722, and audio sub-stream 724 for supporting the audio for visual rendering 721, may originate from computer 727 and viewed on entity 737 through server 728 in a client-server topology.

The processing capabilities of computer 727 divides video, audio, and data sub-streams 724-726 into chunks for streaming over the connection to server 728. As the chunks are assembled, state machine 713 provide the necessary header information for each chunk as the chunks are queued in chunk queue 709. Scheduler 708 executes a scheduling algorithm to determine which chunks should be transmitted in which order. It should be noted that, as above, if a stream were being received by computer 727 instead of transmitting the stream, chunk assembly 718 would be used to assemble the received chunks into the resulting message stream. Through connection 72, which may be the Internet, wide area network (WAN), local area network (LAN), wireless local area networks (WLAN), or the like, chunks are transmitted to server 728. Using an instance of state machine 713 on server 728, the chunks may be received and reassembled, at server 728, using chunk assembly 718. Stream 732 at server 728 is comprised also of audio, video, and data sub-streams 729-731. Server 728 acts as the middle-ware providing stream presentation 720 to each entity subscriber, such as entity 737. As such, when stream 732 is to be sent to client 737, scheduler 708 and queue 709 on server 728 facilitate streaming the chunks via connection 72.

State machine 713 at server 728 assists the streaming of the chunks of audio, video, and data sub-streams 729-731 using connection 72 to entity 737. Upon receiving the chunks, state machine 713 at entity 737 helps decipher and assemble the header invention with chunk assembly 719. Audio, video, and data sub-streams 733-735 of stream 736 are then assembled and may be displayed at entity 737. In such an embodiment, while stream presentation 720 may likely be blocked by a firewall or NAT from reaching entity 737 directly. This complication is preferably avoided by using the middle-ware functionality of server 728. Server 728 preferably has authorized access to entity 737 though any given firewall or NAT. Furthermore, if entity 737 were transmitting the message stream instead of receiving the chunk stream, queue 709 and scheduler 708 on entity 737 would be used to transmit the chunks associated with the message stream.

When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 8:
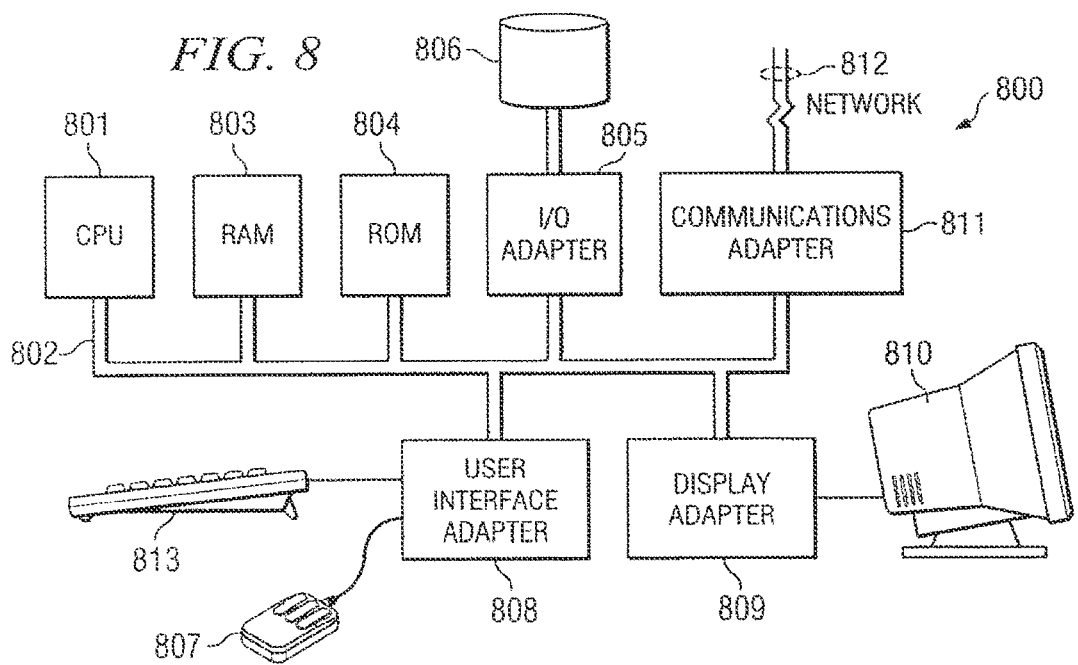
FIG. 8 illustrates a computer system adapted to use the present invention.

FIG. 8 illustrates computer system 800 adapted to use the present invention. Central processing unit (CPU) 801 is coupled to system bus 802. The CPU 801 may be any general purpose CPU, such as an INTERNATIONAL BUSINESS MACHINE (IBM) POWERPC™, INTEL™ PENTIUM™-type processor, or the like. However, the present invention is not restricted by the architecture of CPU 801 as long as CPU 801 supports the inventive operations as described herein. Bus 802 is coupled to random access memory (RAM) 803, which may be SRAM, DRAM, or SDRAM. ROM 804 is also coupled to bus 802, which may be PROM, EPROM, EEPROM, Flash ROM, or the like. RAM 803 and ROM 804 hold user and system data and programs as is well known in the art.

Bus 802 is also coupled to input/output (I/O) controller card 805, communications adapter card 811, user interface card 808, and display card 809. The I/O adapter card 805 connects to storage devices 806, such as one or more of a hard drive, a CD drive, a floppy disk drive, a tape drive, to the computer system. The I/O adapter 805 would also allow the system to print paper copies of information, such as documents, photographs, articles, etc. Such output may be produced by a printer (e.g. dot matrix, laser, and the like), a fax machine, a copy machine, or the like. Communications card 811 is adapted to couple the computer system 800 to a network 812, which may be one or more of a telephone network, a local (LAN) and/or a wide-area (WAN) network, an Ethernet network, and/or the Internet network. User interface card 808 couples user input devices, such as keyboard 813 and pointing device 807 to the computer system 800. The display card 809 is driven by CPU 801 to control the display on display device 810.

Figure 9:
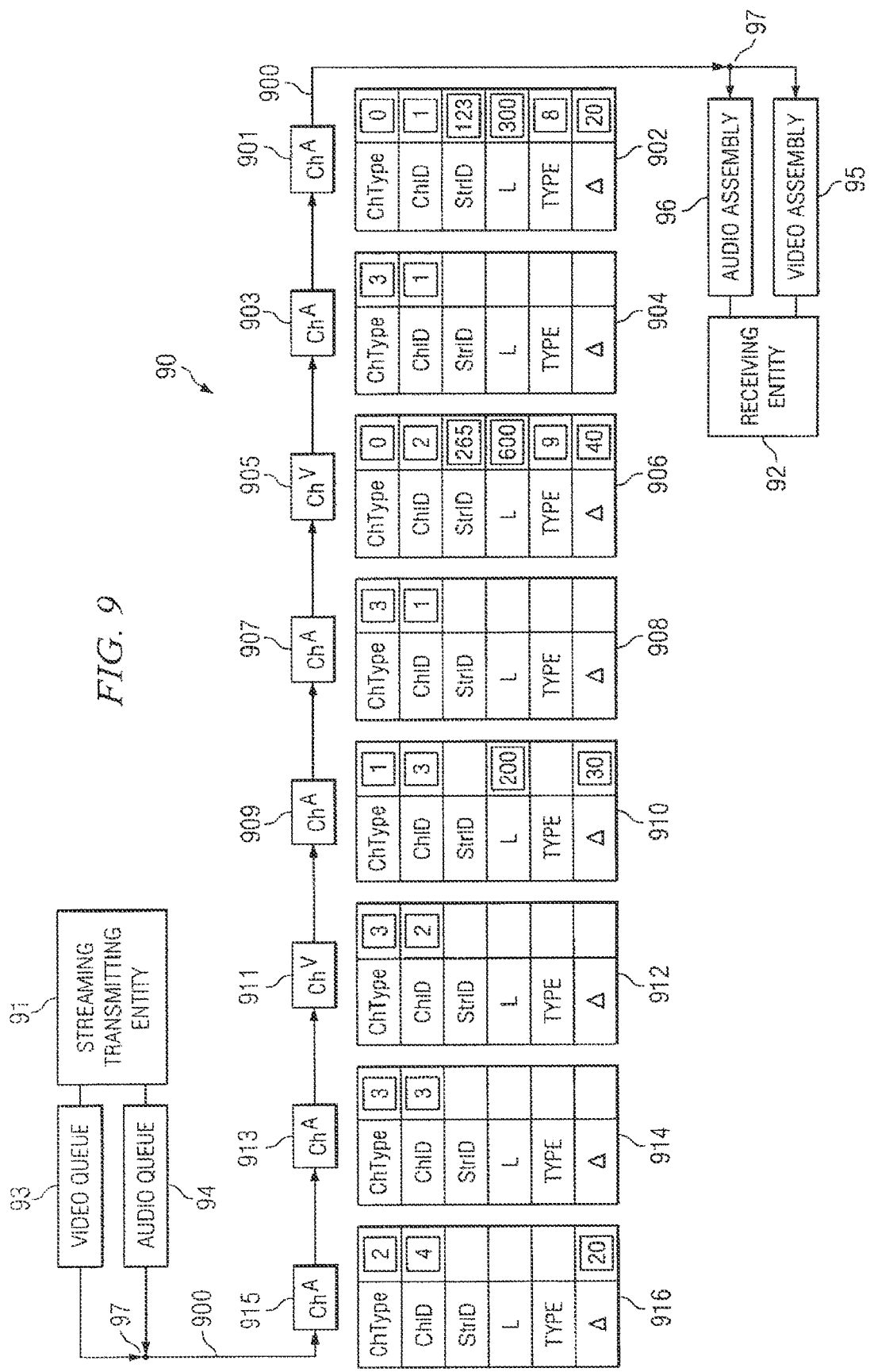
FIG. 9 illustrates a sequence of interleaved audio and video chunks in a real-time priority-based communication system configured according to various embodiments of the present invention.

FIG. 9 illustrates a sequence of interleaved audio and video chunks in real-time priority-based communication system 90 configured according to various embodiments of the present invention. System 90 shows a one-way communication session of streaming media occurring from transmitting entity 91 to receiving player 92 over connection 900. The messages to be streamed may comprise audio, video, and data messages. FIG. 9 shows a message that comprises video and audio sub-streams. As the video and audio sub-streams are broken into video and audio chunks, the state machine of the various embodiments of the present invention supply the necessary header information for the chunks. Transmitting entity 91 places the chunks in either video queue 93 or audio queue 94 to await transmission.

The scheduling algorithm run by transmitting entity 91 controls when chunks are sent to connection interface 97 from either video or audio queue 93 and 94. Chunks 901, 903, 905, 907, 909, 911, 913, and 915 are illustrated on connection 900 along with corresponding header parameters 902, 904, 906, 908, 910, 912, 914, and 916 configured according to the illustrated example of the present invention. Because audio chunks are more sensitive than video chunks, the scheduler sends audio chunk 901 over connection 900 first. Audio chunk 901 includes header 902. Header 902 describes audio chunk as a Type 0 chunk and gives the necessary information that accompanies a Type 0 new message chunk, including the chunk ID, message stream ID, length, message type, and time delta. The state machine at receiving player 92 sets the state for the audio sub-stream beginning with audio chunk 901. Audio chunk 903 is the next chunk sent by the scheduler at transmitting entity 91 and includes header 904. Header 904 identifies chunk 903 as a Type 3 continuation header belonging to chunk ID 1, the chunk ID assigned to the first audio sub-stream. Because audio chunk 903 is a continuation chunk, only the chunk type and chunk ID are required in the header information. The state machine at receiving entity 92 reads that chunk 903 is a Type 3 continuation chunk and keeps all states fixed for the audio sub-stream of chunk ID 1.

The scheduler at transmitting entity 91 sends video chunk 905 next along with header 906. Because video chunk 905 is the first of the video sub-stream, it is designated a Type 0 chunk and includes all of the necessary header information to go along with the first chunk of the video sub-stream. Thus, video chunk 905 may include a different chunk ID, message stream ID, length, message type, and time delta. The state machine at the receiving entity sets the necessary states for the video sub-stream of chunk ID 2. The next chunk sent by the scheduler is audio chunk 907 and header 908. Header 908 identifies chunk 907 as a Type 3 continuation chunk of chunk ID 1. The state machine refers to the states set for the audio sub-stream of chunk ID 1 and maintains those settings for the first audio sub-stream.

The scheduler then sends audio chunk 909 and header 910 across connection 900. Header 910 identifies audio chunk 909 as a Type 0 new message chunk. The state machine at receiving entity 92 resets all information in the states of the audio sub-streams and sets the new states according to header 910. The next chunk in the interleaved sequence is video chunk 911 along with header 912. Header 912 identifies video chunk 911 as a Type 3 continuation chunk of video sub-stream chunk ID 2. The state machine at receiving entity 92 accesses the states set for chunk ID 2 and keeps all of the state information in tact for video chunk 911. The next chunk sent on connection 900 is audio chunk 913 and header 914. Header 914 identifies chunk 913 as a Type 3 continuation chunk of chunk ID 3. The state machine accesses the states saved for the audio sub-stream of chunk ID 3 and maintains each state intact. The final chunk illustrated in FIG. 9 is audio chunk 915 and header 916. Header 916 identities chunk 915 as a Type 2 chunk representing a new message having a new time delta. The state machine reads that chunk 915 is a Type 2 chunk and expects the beginning of a new audio sub-stream with only a change to one of the states for a new chunk ID 4.

As each of chunks 901, 903, 905, 907, 909, 911, 913, and 915 are received at receiving entity 92 through connection interface 97, the audio chunks are re-assembled in audio assembly 96, while the video chunks are re-assembled in video assembly 95 before being played back at receiving entity 92. The state machine at receiving entity 92 preferably reads the parameters in each of headers 902, 904, 906, 908, 910, 912, 914, and 916 controls the re-assembly of the chunks in audio assembly 96 and video assembly 95. In additional embodiments of the present invention other interleaving scheduling algorithms and/or efficiency algorithms may be implemented. The goal is to achieve an efficient mix of audio, video, and data chunks that results in a good playback that minimizes the audio or video jitter in the playback.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer storage medium comprising program instructions that when executed by data processing apparatus cause the data processing apparatus to perform operations comprising:

at a client system, establishing a communication session to receive a media stream from a server system;

receiving through the communication session, as part of the media stream, values of parameters relating to a sub media stream, the values included in a header portion of a first real-time, priority-based network communication of the communication session;

storing the values of the parameters at the client system;

receiving through the communication session, as part of the media stream from the server system, state information and a data payload, the state information being included in a control portion of a second real-time, priority-based network communication of the communication session, and the data payload being included in the second real-time, priority-based network communication;

determining, from the state information, a purpose of the second real-time, priority-based network communication in relation to the media stream from the server system in accordance with whether a header portion of the second real-time, priority-based network communication includes, either, only one or more new values corresponding to one or more of the parameters, or no values corresponding to the parameters;

updating, when the second header portion includes the one or more new values, one or more of the stored values based, at least in part, on the one or more new values; and processing the data payload based at least in part on the determined purpose and the stored values of the parameters.

2. The computer storage medium of claim 1, wherein the operation of determining the purpose comprises identifying the purpose from a set of possible purposes including:

beginning a new sub media stream, the second header portion including the one or more new values comprising sub media stream values corresponding to the parameters, and indicating a new media type, the second header portion including the one or more new values comprising values corresponding to fewer than all of the parameters.

3. The computer storage medium of claim 2, wherein the operation of determining the purpose comprises identifying the purpose from the set of possible purposes including:

providing a new time, the second header portion including the one or more new values being one new value corresponding to one of the parameters, and continuing the sub media stream, the second header portion having no values corresponding to the parameters.

4. The computer storage medium of claim 1, wherein the parameters include one or more of a sub media stream identifier parameter, a length parameter, a media type parameter, and a time delta parameter.

5. The computer storage medium of claim 1, wherein
the sub media stream comprises a first sub media stream, and
the operations further comprise
receiving through the communication session, as part of the media stream, real-time, priority-based network communications associated with a second sub media stream, wherein the real-time, priority-based network communications include state information and data payloads, and
assembling a playable portion of the second sub media stream based at least in part on state information and the data payloads.

6. The computer storage medium of claim 5, wherein the operations further comprise playing the assembled portion of the second sub media stream relative to a media type indicated by at least one of the stored values of the parameters.

7. The computer storage medium of claim 6, wherein the operation of playing the assembled playable portion of the second sub media stream comprises controlling a state machine in accordance with the at least one of the stored values of the parameters.

8. The computer storage medium of claim 5, wherein the operations further comprise storing the assembled playable portion of the second sub media stream.

9. A system comprising:
one or more hardware processors; and
a storage system communicatively coupled with the one or more hardware processors and encoding instructions that, when executed by the one or more hardware processors, cause the system to perform operations comprising:
establishing a communication session to receive a media stream from a server system;
receiving through the communication session, as part of the media stream, values of parameters relating to a sub media stream, the values included in a header portion of a first real-time, priority-based network communication of the communication session;
storing the values of the parameters on the storage system;
receiving through the communication session, as part of the media stream from the server system, state information and a data payload, the state information being included in a control portion of a second real-time, priority-based network communication of the communication session, and the data payload being included in the second real-time, priority-based network communication;
determining, from the state information, a purpose of the second real-time, priority-based network communication in relation to the media stream from the server system in accordance with whether a header portion of the second real-time, priority-based network communication includes, either, only one or more new values corresponding to one or more of the parameters, or no values corresponding to the parameters;
updating, when the second header portion includes the one or more new values, one or more of the stored values based, at least in part, on the one or more new values; and
processing the data payload based at least in part on the determined purpose and the stored values of the parameters.

10. The system of claim 9, wherein the operation of determining the purpose comprises identifying the purpose from a set of possible purposes including:
beginning a new sub media stream, the second header portion including the one or more new values comprising sub media stream values corresponding to the parameters, and
indicating a new media type, the second header portion including the one or more new values comprising values corresponding to fewer than all of the parameters.

11. The system of claim 10, wherein the operation of determining the purpose comprises identifying the purpose from the set of possible purposes including:
providing a new time, the second header portion including the one or more new values being one new value corresponding to one of the parameters, and
continuing the sub media stream, the second header portion having no values corresponding to the parameters.

12. The system of claim 9, wherein the parameters include one or more of a sub media stream identifier parameter, a length parameter, a media type parameter, and a time delta parameter.

13. The system of claim 9, wherein
the sub media stream comprises a first sub media stream, and
the operations further comprise
receiving through the communication session, as part of the media stream, real-time, priority-based network communications associated with a second sub media stream, wherein the real-time, priority-based network communications include state information and data payloads, and
assembling a playable portion of the second sub media stream based at least in part on state information and the data payloads.

14. The system of claim 13, wherein the operations further comprise playing the assembled portion of the second sub media stream relative to a media type indicated by at least one of the stored values of the parameters.

15. The system of claim 14, wherein the operation of playing the assembled playable portion of the second sub media stream comprises controlling a state machine in accordance with the at least one of the stored values of the parameters.

16. The system of claim 13, wherein the operations further comprise storing the assembled playable portion of the second sub media stream.

17. A method comprising:
at a client system, establishing a communication session to receive a media stream from a server system;
receiving through the communication session, as part of the media stream, values of parameters relating to a sub media stream, the values included in a header portion of a first real-time, priority-based network communication of the communication session;
storing the values of the parameters on the client system;
receiving through the communication session, as part of the media stream from the server system, state information and a data payload, the state information being included in a control portion of a second real-time, priority-based network communication of the communication session, and the data payload being included in the second real-time, priority-based network communication;

determining, by the client system from the received state information, a purpose of the second real-time, priority-based network communication in relation to the media stream from the server system in accordance with whether a header portion of the second real-time, priority-based network communication includes, either, only one or more new values corresponding to one or more of the parameters, or no values corresponding to the parameters;

updating, when the second header portion includes the one or more new values, one or more of the stored values based, at least in part, on the one or more new values; and processing, by the client system, the data payload based at least in part on the determined purpose and the stored values of the parameters.

18. The method of claim 17, wherein determining the purpose comprises identifying the purpose from a set of possible purposes including:

beginning a new sub media stream, the second header portion including the one or more new values comprising sub media stream values corresponding to the parameters, and indicating a new media type, the second header portion including the one or more new values comprising values corresponding to fewer than all of the parameters.

19. The method of claim 18, wherein determining the purpose comprises identifying the purpose from the set of possible purposes including:

providing a new time, the second header portion including the one or more new values being one new value corresponding to one of the parameters, and continuing the sub media stream, the second header portion having no values corresponding to the parameters.

20. The method of claim 17, wherein the parameters include one or more of a sub media stream identifier parameter, a length parameter, a media type parameter, and a time delta parameter.

21. The method of claim 17, wherein the sub media stream comprises a first sub media stream, and the method further comprises receiving through the communication session, as part of the media stream, real-time, priority-based network communications associated with a second sub media stream, wherein the real-time, priority-based network communications include state information and data payloads, and assembling, by the client system, a playable portion of the second sub media stream based at least in part on state information and the data payloads.

22. The method of claim 21, further comprising playing, by the client system, the assembled portion of the second sub media stream relative to a media type indicated by at least one of the stored values of the parameters.

23. The method of claim 22, wherein playing the assembled playable portion of the second sub media stream comprises controlling a state machine in accordance with the at least one of the stored values of the parameters.

24. The method of claim 21, further comprising storing the assembled playable portion of the second sub media stream.

* * * * *